(12) United States Patent
Henle

(10) Patent No.: US 6,973,915 B1
(45) Date of Patent: Dec. 13, 2005

(54) DEVICE FOR CONTROLLING AN ENGINE

(75) Inventor: Jorg Henle, Weikersheim (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 213 days.

(21) Appl. No.: 10/009,006

(22) PCT Filed: Jun. 6, 2000

(86) PCT No.: PCT/EP00/05133

§ 371 (c)(1),
(2), (4) Date: Dec. 3, 2001

(87) PCT Pub. No.: WO00/76842

PCT Pub. Date: Dec. 21, 2000

(30) Foreign Application Priority Data

Jun. 11, 1999 (DE) ................................ 199 26 800

(51) Int. Cl.[7] ................................................. F02D 9/00
(52) U.S. Cl. ........................ 123/399; 123/400; 318/628
(58) Field of Search ................................ 123/399, 400; 318/628

(56) References Cited

U.S. PATENT DOCUMENTS

| | | | | |
|---|---|---|---|---|
| 4,494,061 A | * | 1/1985 | Kaye ........................... | 318/628 |
| 4,643,148 A | * | 2/1987 | Jedrziewski ................ | 123/376 |
| 4,665,765 A | * | 5/1987 | Heine .......................... | 74/458 |
| 5,489,830 A | * | 2/1996 | Fernandez ................... | 318/628 |
| 5,720,202 A | * | 2/1998 | Senjo et al. ................ | 74/89.36 |
| 5,740,884 A | * | 4/1998 | DiMucci et al. ............. | 182/141 |
| 6,128,554 A | * | 10/2000 | Damotte ...................... | 318/628 |

FOREIGN PATENT DOCUMENTS

GB    2114717    *    8/1983

* cited by examiner

*Primary Examiner*—Erick Solis
(74) *Attorney, Agent, or Firm*—Bachman & LaPointe, P.C.

(57) ABSTRACT

The invention relates to a device for controlling an engine, in particular of an aircraft. The device has at least one throttle and a regulating device for additionally controlling the throttle automatically. A displacement of the throttle is transmitted permanently, in a direct or indirect manner to a position sensor.

10 Claims, 2 Drawing Sheets

DEVICE FOR CONTROLLING AN ENGINE

BACKGROUND OF THE INVENTION

The present invention relates to an arrangement for controlling an engine, in particular of an aircraft, having at least one gas lever and a regulating device for the additional automatic driving of the gas lever.

Such arrangements are known and are common on the market in a wide variety of forms and designs. They serve in particular to control and start up an engine, for example of an aircraft.

A disadvantage with such conventional arrangements is that they do not provide sufficient safety if, for example during operation with an autopilot, the electric circuit or even the regulating motor fails.

It is then often disadvantageous that the pilot is not able to recognize the actual situation and position of the gas lever or the operating state of the engine.

This may have considerable undesirable consequences, in particular it may even result in aircraft crashing.

GB 2 114 717 A discloses a control arrangement for the active driving of, for example, a gas lever for controlling aircraft engines. In this case, the gas lever is in engagement with a spindle which has a small pitch and is designed to be self-locking. The gas lever can be driven only in an active manner via a drive motor which is connected directly or indirectly to the spindle. A disadvantage with this is that, if the electrical power fails, the spindle, in particular the gas lever, cannot be moved or driven manually.

U.S. Pat. No. 4,494,061 describes a control device for an aircraft, a gas lever being movable in an active manner via motors in order to indicate the current operating state of an engine.

The object of the present invention is to provide an arrangement of the type mentioned at the beginning in which an engine can be permanently controlled manually and/or automatically in a simple, reliable and cost-effective manner.

SUMMARY OF THE INVENTION

This object is achieved by virtue of the fact that a movement of the gas lever can be transmitted permanently, directly or indirectly, to a displacement measuring system and the gas lever is seated so as to be mounted in a linearly movable manner via a guide bush of a rotatable spindle, the spindle being designed as a non-self-locking trapezoidal screw spindle having a large pitch.

In the present invention, the gas lever sits on a spindle which can be driven via a regulating motor for operation by means of autopilot. The pilot then recognizes the current state, in particular the operating state, of the engine in every situation and position.

If, for example, this regulating motor fails, he can manually actuate the gas lever. A spindle, on whose end a displacement measuring system sits, rotates due to the actuation of the gas lever. This displacement measuring system then transmits the corresponding information directly or indirectly via a computer to the engine. The movement of the gas lever is then independent of the regulating motor.

Within the scope of the invention in this case, it is also intended to use other displacement measuring systems which, for example, are suitable for detecting a rotary movement or a linear movement of the gas lever and for converting said rotary movement or linear movement into a signal.

In this case, the displacement measuring system may be of an inductive, magnetic and/or optical type. There is no limit to the invention in this respect.

Furthermore, it is important in the case of the present invention that the gas lever is guided linearly in a guide slot or along a guide element in order to produce a rotary movement with the spindle by means of the guide bush which is in engagement with the spindle. This rotary movement of the spindle is then transmitted to the displacement measuring system.

It has proved to be especially advantageous to use a spindle as a trapezoidal screw spindle which has a large pitch. This ensures absolute safety against self-locking during the manual and/or electrical movement of the guide bush, in particular of the gas lever in the guide slot. Furthermore, such trapezoidal screw spindles have high rigidity and no tilting moments. They are suitable for linear precision guidance. In addition, a complex type of construction in a very narrow space is ensured and can be produced very cost-effectively.

Furthermore, it is advantageous in the case of the present invention that, without electrical power, the spindle can be set in rotation by purely manual movement of the gas lever in a linear direction, this rotation of the spindle being transmitted directly to the displacement measuring system. The latter then supplies the corresponding signals for controlling the engine.

As a result, the safety for controlling and starting up an engine is additionally increased.

BRIEF DESCRIPTION OF THE DRAWINGS

Further advantages, features and details of the invention follow from the description below of preferred exemplary embodiments and with reference to the drawing, in which.

DETAILED DESCRIPTION

Figure 1:
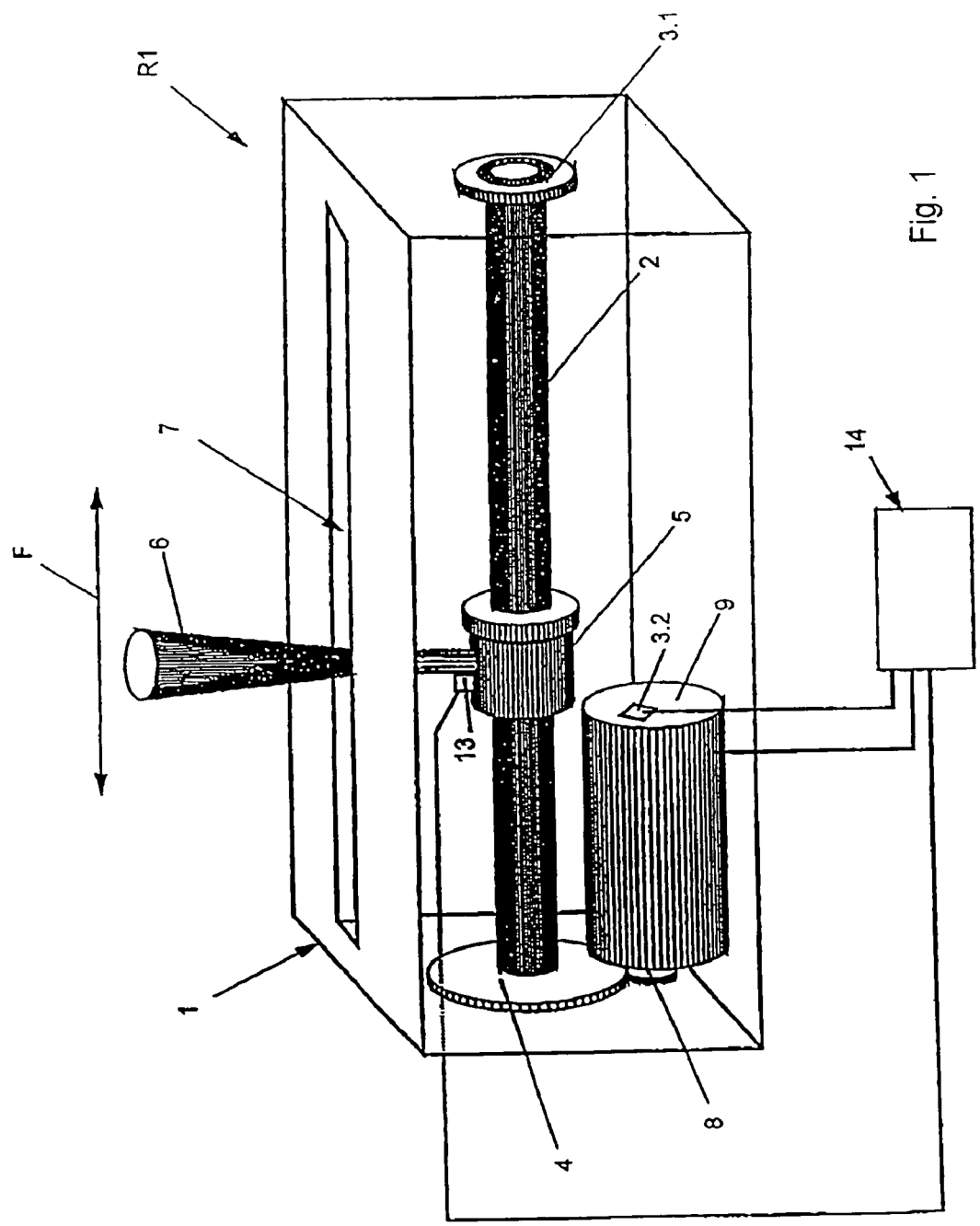
FIG. 1 shows a schematic perspective view of an arrangement for controlling an engine.

According to FIG. 1, an arrangement $R_1$ according to the invention for controlling an engine (not shown here), in particular of an aircraft, has a housing 1 in which a spindle 2 is mounted in a rotatable manner, preferably in the longitudinal direction of the housing 1. A displacement measuring system 3.1 sits on one end of the spindle 2 and a drive disk 4 sits on the other end.

Sitting on the spindle 2 is a guide bush 5, which is in engagement with the spindle 2.

Adjoining the guide bush 5 is a gas lever 6. The latter is linearly guided in a guide slot 7 the housing 1. The guide slot 7 is arranged approximately parallel to the spindle 2 in the housing 1 of the arrangement $R_1$.

Adjoining the drive disk 4 via a drive gear 8 is a regulating motor 9 of a regulating device which transmits a rotary movement to the spindle 2. The gas lever 6 is moved back and forth in a linear manner along the guide slot 7 by the rotary movement of the spindle 2.

Assigned to the regulating motor 9 or the regulating device is a further displacement measuring system 3.2 which is connected to a control 14 via a connecting line (not designated).

In this way, the actual position and of the actual operating state of the engine can be inferred exactly via the position of the regulating device or the regulating motor 9.

To assist the drive movement of the spindle 2 and in particular the linear movement during manual actuation of the gas lever 6, a force sensor 13 is assigned to the gas lever 6 and/or the guide bush 5.

If the gas lever 6 is accordingly moved with a force F as shown in the direction of the double arrow, the regulating device 9 is connected to load and actuates the spindle 2, so that a movement and an automatically guided movement of the gas lever 6 is possible.

The pilot does not have to set the spindle 2 in corresponding rotation manually by his own force under any circumstances in order to change an operating state of an adjoining engine.

The functioning of the present invention is as follows:

If an aircraft is operated, for example, by means of an autopilot, the gas lever 6 is moved along by means of the regulating motor 9 in accordance with the control of the aircraft, so that the pilot, in every situation, recognizes the operating state of an engine from the position of the gas lever 6 in the guide slot 7.

At the same time, in the case of manual operation, an operating state is transmitted to a computer (not shown here) of the aircraft either via the regulating motor 9 and/or via the displacement measuring system 3.1, 3.2., this computer then controlling the corresponding engine.

It is especially advantageous in the case of the present invention that the gas lever 6 can be actuated manually, for example if the regulating motor 9 fails, and that the pilot recognizes the operating state of the engine on the basis of the spindle-mounted position of the gas lever 6.

He can manually shift the gas lever 6 in a purely mechanical manner, as a result of which the spindle 2 rotates. This rotary movement is determined in the displacement measuring system 3.1, 3.2 and is transmitted to the corresponding computer for controlling the engine.

It is therefore also still possible, for example in the event of a power failure, to transmit the electrical signal from the displacement measuring system 3.1, 3.2 to the engine. This is of fundamental importance in the case of the present invention, since the safety of the aircraft is considerably increased with a corresponding arrangement for operating an engine.

In the event of an electrical failure of the system, no self-locking occurs. The gas lever 6 can be moved manually by hand, in which case the original position and setting of the operating state of the engine can be seen in every situation.

Self-locking is ruled out because the spindle 2 is designed as a trapezoidal screw spindle having a high pitch. Furthermore, this trapezoidal screw spindle has high rigidity, in particular high flexural and torsional rigidity. It permits no torsional flexure or tilting moments. It can therefore be manually rotated very precisely by the linear movement of the gas lever 6 via the guide bush 5 without any risk of self-locking in order to transmit the electrical signal for controlling the engine to the displacement measuring systems 3.1, 3.2 directly or indirectly by a manual movement.

The control 14 at least partly takes over the guided movement of the gas lever 6 or the guide bush 5 if, for example, the force sensor 13 is actuated. The regulating motor 9 is then accordingly connected to load in order to electrically assist the manual movement of the gas lever 6. The control 14 may be an external component of the housing 1 or of the regulating device 9. This is to be included by the present idea of the invention.

Figure 2:
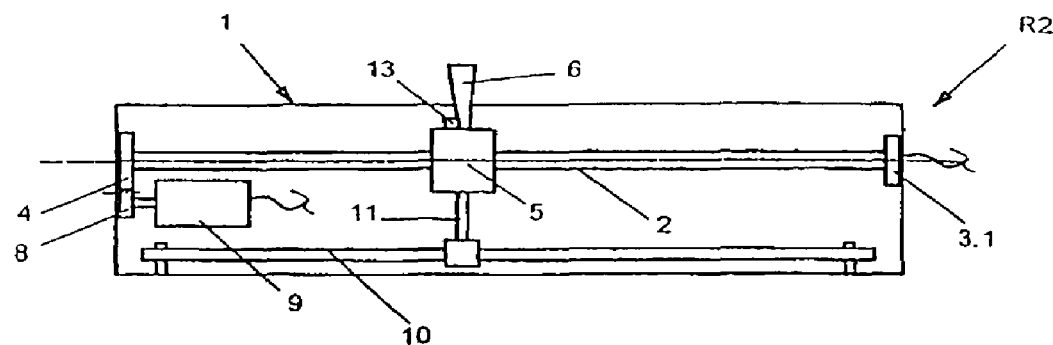
FIG. 2 shows a schematic plan view of a further arrangement for controlling an engine.

In the exemplary embodiment of the present invention according to FIG. 2, an arrangement $R_2$ is shown in which, in the manner described above, the spindle 2 is arranged so as to be mounted in a rotatable manner in the housing 1, the displacement measuring system 3.1, 3.2 for measuring the rotations of the spindle 2 being arranged at one end, and the drive disk 4 being arranged at the other end. The drive disk 4 is controlled in the manner described above via the drive gear 8 by means of the regulating motor 9 having the displacement measuring system 3.2, for example during operation by means of the autopilot. The force sensor 13, which, as described above, is connected to the control 14, is assigned to the gas lever 6 and/or the guide bush 5.

A difference from the exemplary embodiment according to FIG. 1 is that a guide slot 7 may be dispensed with, linear guidance via a linear guide element 10 being possible if the guide bush 5 or the gas lever 6 are coupled to the guide element 10, for example via a connecting member 11. In this case, the guide element 10 runs approximately parallel to the spindle 2.

Figure 3:
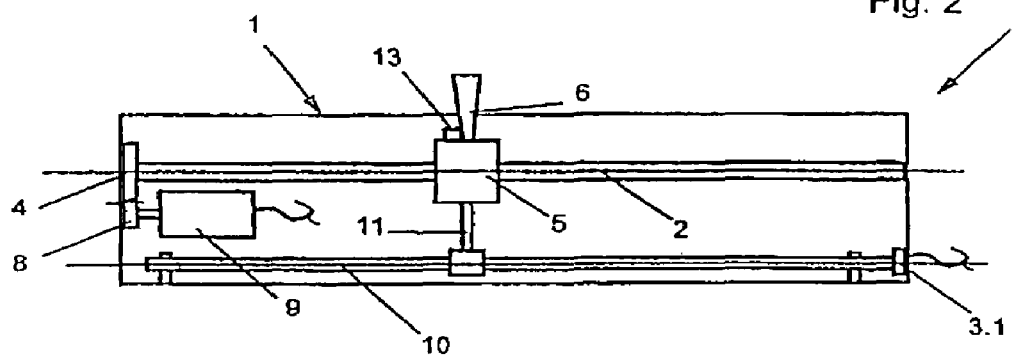
FIG. 3 shows a schematic plan view of a further exemplary embodiment of the arrangement for controlling an engine according to FIGS. 1 and 2.

According to FIG. 3, an arrangement $R_3$ has a housing 1 in which, as described above, a spindle 2 is mounted in a rotatable manner. Arranged on the end of the spindle 2 is the drive disk 4, which can be rotated via the drive gear 8 of the regulating motor 9 having the displacement measuring system 3.2. The gas lever 6 sits with its guide bush 5 on the spindle 2, the guide bush 5 being in engagement with the spindle 2.

The connecting member 11 adjoins the guide bush 5 or the gas lever 6 and sits via a further guide bush (not designated here) on a spindle 2 which is designed as guide element 10 and on the end of which the displacement measuring system 3.1 is provided.

In this case, the guide element 10 is accordingly rotated during the linear movement of the gas lever 6, so that this rotary movement is determined in the displacement measuring system 3.1, 3.2 and an electrical signal is transmitted directly or indirectly to the engine. It is to be possible in this case within the scope of the present invention for the displacement measuring system 3.1 to be formed along the guide element 10, for example, as a magnetic strip element or the like in order to correspondingly transmit a signal to the engine or to the computer of the engine during the corresponding linear displacement or movement of the gas lever 6.

Figure 4:
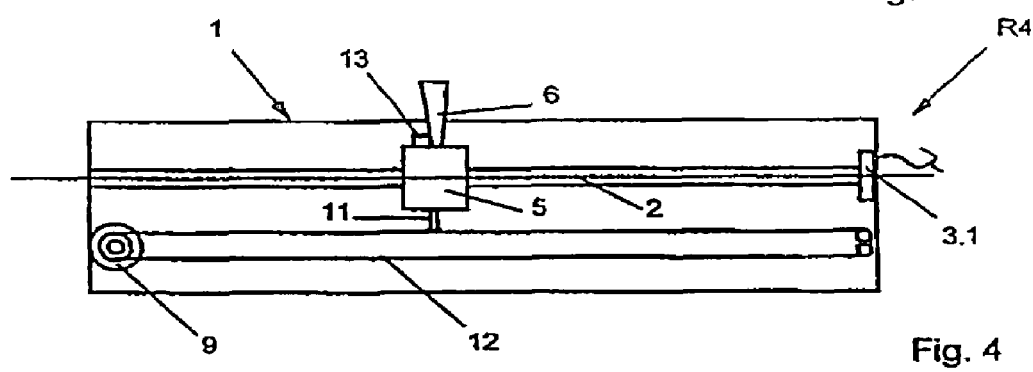
FIG. 4 shows a schematic plan view of a further exemplary embodiment of the arrangement according to FIGS. 1 to 3.

In the exemplary embodiment of the present invention according to FIG. 4, an arrangement $R_4$ is shown which essentially corresponds in construction to FIG. 3. A difference is that the regulating motor 9 operates a drive means 12 which is in engagement with the guide bush 5 of the gas lever 6 via the connecting member 11.

As a result, the gas lever 6, for example during operation by means of the autopilot, can be automatically controlled in accordance with the operating state of the engine. In this case, the drive means 12 may be a chain, a toothed belt or an element like that. There is no limit to the invention in this respect.

Figure 5:
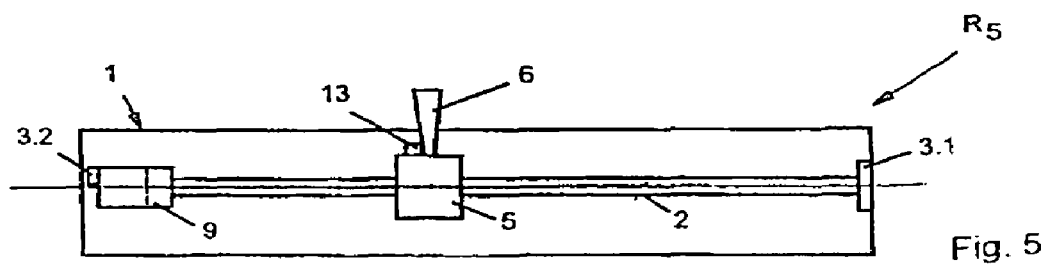
FIG. 5 shows a schematic plan view of a further exemplary embodiment of the arrangement according to FIGS. 1 to 4.

According to FIG. 5, an arrangement $R_5$ is shown in which, in a housing 1, the guide bush 5 is correspondingly guided linearly on the spindle 2 by means of the gas lever 6 in the manner described above. The force sensor 13, which is likewise connected to the control 14 (not shown), is assigned to the gas lever 6 and/or the guide bush 5.

Here, the regulating device 9, in particular the regulating motor, directly adjoins the spindle 2. If need be, a gear unit is superimposed, as indicated by broken line.

At the other end, the displacement measuring system 3.1 sits on the spindle 2 in the manner described above. Furthermore, the displacement measuring system 3.2, as described above, is likewise assigned to the regulating device 9. The gas lever 6 is linearly guided in the housing 1 in accordance with FIG. 1.

| List of item numbers | |
|---|---|
| 1 | Housing |
| 2 | Spindle |
| 3 | Displacement measuring system |
| 4 | Drive disk |
| 5 | Guide bush |
| 6 | Gas lever |
| 7 | Guide slot |
| 8 | Drive gear |
| 9 | Regulating device |
| 10 | Guide element |
| 11 | Connecting member |
| 12 | Drive means |
| 13 | Force sensor |
| 14 | Control |
| $R_1$ | Arrangement |
| $R_2$ | Arrangement |
| $R_3$ | Arrangement |
| $R_4$ | Arrangement |
| $R_5$ | Arrangement |
| P | Force |

What is claimed is:

1. An arrangement for controlling an engine, comprising: a housing having a guide slot;
at least one gas lever (6) guided linearly in the guide slot (7) of the housing (1); and
a regulating device (9) for additional automatic driving of the gas lever (6), wherein movement of the gas lever (6) is transmitted permanently, directly or indirectly, to a displacement measuring system (3.1, 3.2), wherein linear, manual movement of the gas lever (6) is transmitted mechanically to the displacement measuring system (3.1, 3.2), wherein at least one of linear, mechanical and automatic movement of the gas lever (6) is coupled mechanically to the movement of a displacement measuring system (3.1, 3.2), and wherein the gas lever (6) is seated so as to be mounted in a linearly movable manner via a guide bush (5) of a rotatable spindle (2), the spindle (2) being a non-self-locking trapezoidal screw spindle having a large pitch and the guide slot (7) being arranged approximately parallel to the spindle (2); and further comprising a force sensor operatively associated with the regulating device and assigned to at least one of the gas lever (6) and the guide bush (5) for switching on the regulating device upon sensing a force applied to the gas lever, whereby manual linear movement of the gas lever can be assisted.

2. The arrangement as claimed in claim 1, characterized in that the spindle (2) is mounted so as to be rotatable in accordance with the movement of the guide bush (5) by a linear movement of the gas lever (6).

3. The arrangement as claimed in claim 1, characterized in that the displacement measuring system (3.1) is arranged on one end of the spindle (2).

4. The arrangement as claimed in claim 3, characterized in that the regulating device (9), as regulating motor having an associated displacement measuring system (3.2), acts directly or indirectly on the other end of the spindle (2).

5. The arrangement as claimed in claim 1, characterized in that a drive disk (4) is arranged on one end of the spindle (2).

6. The arrangement as claimed in claim 5, characterized in that a regulating motor (9) is connected to the drive disk (4).

7. The arrangement as claimed in claim 1, characterized in that the gas lever (6) is connected directly or indirectly to a guide element (10) which runs approximately parallel to the spindle (2).

8. The arrangement as claimed in claim 1, characterized in that the displacement measuring system (3.1, 3.2), is a displacement transducer of an inductive, magnetic or optical type.

9. The arrangement as claimed in claim 1, characterized in that at least one of the displacement measuring system (3.1, 3.2), the force sensor (13) and the regulating device (9) is connected to a control (14) in order to assist a manual movement of the gas lever (6) by connecting the regulating device (9) to load, it being possible for the respective positions of the gas lever (6) to be transmitted via the displacement measuring systems (3.1, 3.2) to the engine in accordance with the operating state.

10. An arrangement for controlling an engine, comprising: a housing having a guide slot;
at least one gas lever (6); and
a regulating device (9) for additional automatic driving of the gas lever (6), wherein movement of the gas lever (6) is transmitted to a displacement measuring system (3.1, 3.2), and wherein the gas lever (6) is seated so as to be mounted in a linearly movable manner via a guide bush (5) of a rotatable spindle (2) within the housing, the gas lever extending through and being guided linearly in the guide slot, and further comprising a force sensor positioned between the gas lever and the guide bush for sensing force applied to the gas lever, the force sensor further being operatively associated with the regulating device for switching on the regulating device upon sensing a force applied to the gas lever, whereby manual linear movement of the gas lever can be assisted.

* * * * *